United States Patent [19]

Gehalo et al.

[11] Patent Number: 4,595,983

[45] Date of Patent: Jun. 17, 1986

[54] CENTRAL OFFICE POWERED CREDIT ONLY TELEPHONE PAYSTATION

[75] Inventors: David J. Gehalo, Richardson; Thomas M. Fisher, Plano, both of Tex.

[73] Assignee: Reliance Electric Company, Cleveland, Ohio

[21] Appl. No.: 545,786

[22] Filed: Oct. 27, 1983

[51] Int. Cl.4 .................. G06F 15/22; G06F 15/24; G06K 15/00; H04M 17/02

[52] U.S. Cl. .................... 364/401; 235/380; 235/381; 235/382; 179/6.3 CC; 179/6.3 R

[58] Field of Search ............... 364/401; 235/380, 381, 235/382; 179/6.3 CC, 6.3 R

[56] References Cited

U.S. PATENT DOCUMENTS

| | | | |
|---|---|---|---|
| 3,022,381 | 2/1962 | Pferd | 179/6.3 CC |
| 3,784,793 | 1/1974 | Ito et al. | 179/6.3 CC |
| 3,929,278 | 12/1975 | Balovine | 340/825.33 |
| 3,959,607 | 5/1976 | Vargo | 179/6.3 CC |
| 4,124,774 | 11/1978 | Zarouni | 179/6.3 R |
| 4,326,123 | 4/1982 | Hosterman | 179/6.3 CC X |
| 4,361,731 | 11/1982 | Smoot | 179/6.3 R |
| 4,439,636 | 3/1984 | Newkirk et al. | 179/6.3 CC X |
| 4,517,412 | 5/1985 | Newkirk et al. | 179/6.3 CC X |

FOREIGN PATENT DOCUMENTS

| | | | |
|---|---|---|---|
| 56-49694 | 1/1981 | Japan | 179/6.3 CC |
| 1442883 | 7/1976 | United Kingdom | 179/6.3 CC |
| 2077013A | 12/1981 | United Kingdom | 179/6.3 CC |

OTHER PUBLICATIONS

"AT&T Consumer Products Challange", Dec. 19, 1983, Issue 11, p. 1.

Primary Examiner—Jerry Smith
Assistant Examiner—Charles B. Meyer
Attorney, Agent, or Firm—Michael M. Rickin

[57] ABSTRACT

A credit only paystation for allowing a user to place telephone calls therefrom without having to use coinage coins. The paystation includes a reader to read the users credit information which may be encoded on the magnetic stripe of a conventional credit card. The paystation uses a microcomputer to process the credit information and the dialing information entered by the user. The paystation also allows the user to dial a plurality of nonrestricted numbers without having to use a credit card. The paystation is powered solely from the central office to which it is connected and keeps the transmitter turned off until it is needed.

32 Claims, 11 Drawing Figures

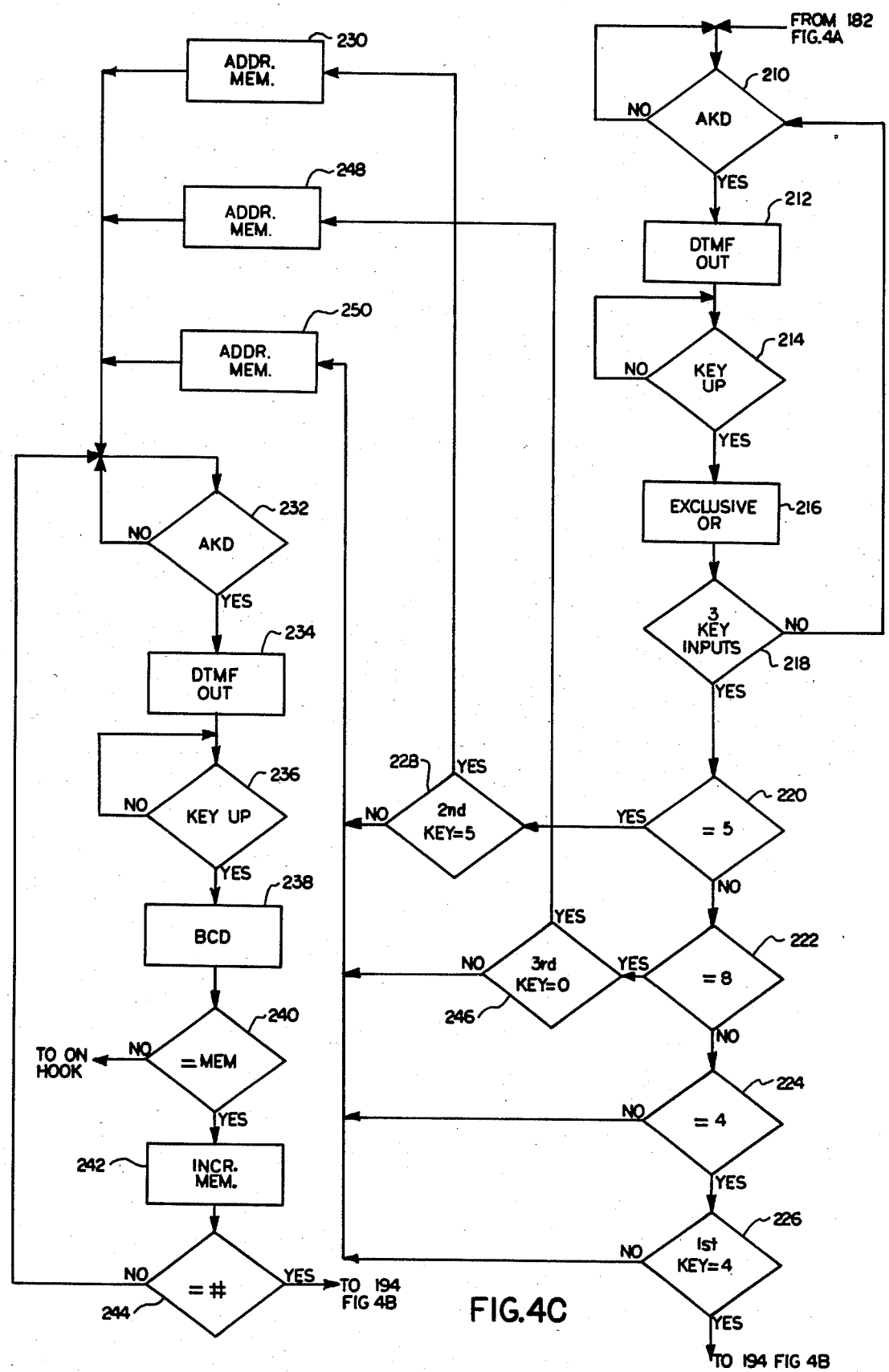

CENTRAL OFFICE POWERED CREDIT ONLY TELEPHONE PAYSTATION

BACKGROUND OF THE INVENTION

1. Field of the Invention

This invention pertains to a telephone paystation, and more particularly, to a paystation which only accepts and reads a credit card as the form of payment for calls made therefrom and which is powered solely from the central office to which it is connected.

2. Description of the Prior Art

Coin operated paystations have been in use for a number of years. Telephone companies have also been issuing cards which may be used by credit-worthy customers for charging telephone calls from such paystations in lieu of using coins. The problems with the use of such cards has been that the customer had to interface with the operator, and also had to recite a long credit card number to the operator. Therefore, not only was the customer charged at the operator assisted rate for the call, but the possibilities existed for the misuse of lost or stolen cards or fraud on the telephone company.

Recently, telephone companies have been installing paystations in high traffic areas, such as airports, which do not accept coins. These paystations allow the user to enter the number of the telephone being called as well as the number of his telephone company issued credit card through the use of the keypad. This allows the caller to avoid use of the operator and thereby obtain a preferential rate for the call. The major drawback with such telephones is that the caller must enter the credit card number himself. This number is generally in the order of fourteen (14) digits and, therefore, the customer may have to enter a total of up to twenty-five (25) digits in order to make a long distance call from the paystation. This is a cumbersome procedure which may lead to error. In addition, the customer may become frustrated if he finds it necessary to redial because of an inability to reach the called party for whatever reason.

Finally, recent favorable decisions by the Federal Communications Commission have allowed other common carriers (OCC's) to compete with the telephone operating company in providing long distance service. These OCC's may find it desirable to provide their own coinless paystations in high traffic areas. Therefore, it is desirable that such paystations be relatively easy to operate. It is also desirable that such paystations take advantage of the ability of a credit card to store credit related information thereon. Such stations could be installed and used with minimal changes to the telephone company or OCC central office as such offices now have the capability of receiving customer entered credit information for purposes of billing.

Telephones which include mechanisms for reading credit cards are known. One such example is shown in U.K. Pat. No. 1,442,883, entitled "Telephone System With Special Kinds of Telephone Sets." In the system described therein the special telephone sets have a receptacle wherein the user may insert a mechanically readable card. The telephone set sends a signal to the exchange indicating that the card has been inserted. In response to that signal, the exchange connects a control unit to the telephone which sends a signal to the telephone which causes the card to be read and the information thereon sent to the unit. Upon receipt of the information, the unit sends a dial tone to the telephone. The internal structure of the telephone and its manner of powering are not described. It is clear, however, that these special telephones are not conventional in that the dial tone does not result from the closing of any hookswitch, but rather from the exchange (C.O.) only after the data on the card has been read and transmitted to it.

Another such example is U.S. Pat. No. 4,326,123 entitled "Telephone Credit Card System." It appears that that system uses a card having on it at least the receiving phone number and the credit card number. The information on the card is read and transmitted to a general purpose computer. The computer is used to interface with the telephone network. It then appears that the computer asks either for a further readout or authorizes the actuation of the dialer associated with the reader. Unfortunately, a complete understanding of the system cannot be obtained from the patent as the description and drawing figures are not fully clear as to its operation.

It is, therefore, desirable that a credit only paystation appear to the user to function in a manner similar to that of conventional coin operated paystations. It is further desirable that such a paystation be connected to the C.O. and activated upon the lifting of the handset by the user. It is also desirable that such a paystation allow the user to dial certain predetermined numbers without the necessity of first establishing credit worthiness. Additionally, it is desirable that such a paystation allow the predetermined numbers to be changed by a service person. Lastly, it is desirable that such a paystation be powered entirely from the central office to which it is connected.

SUMMARY OF THE INVENTION

According to the present invention there is described a credit only paystation. The paystation has conventional means to enter dialing information and conventional handset and interface circuitry which includes a hookswitch. The paystation is connectable to a central office.

In addition to the conventional circuitry described above the paystation includes means to read encoded credit information inserted therein by a user of the paystation. The information represents a number to which any telephone calls placed by the user are to be charged.

The paystation also includes a microcomputer which is connected to the dialing entry means and the credit reading means. The microcomputer is inactive when the hookswitch is open and is reset and activated when the hookswitch is closed. The microcomputer receives signals from the dialing means and the reading means in a first predetermined sequence. These signals have predetermined formats.

The paystation also includes a data output means which is connected to the microcomputer. The data output means receives signals from the microcomputer which are representative of the dialing information and the credit information. These signals are received in a second predetermined sequence and have a predetermined format. In response to those signals the data output means provides signals to the central office.

DESCRIPTION OF THE DRAWING

FIGS. 4A to 4C are a flow diagram of that part of the program utilized in the embodiment of FIG. 1 to control the dialing of non-restricted numbers.

DESCRIPTION OF THE PREFERRED EMBODIMENT

Figure 1:
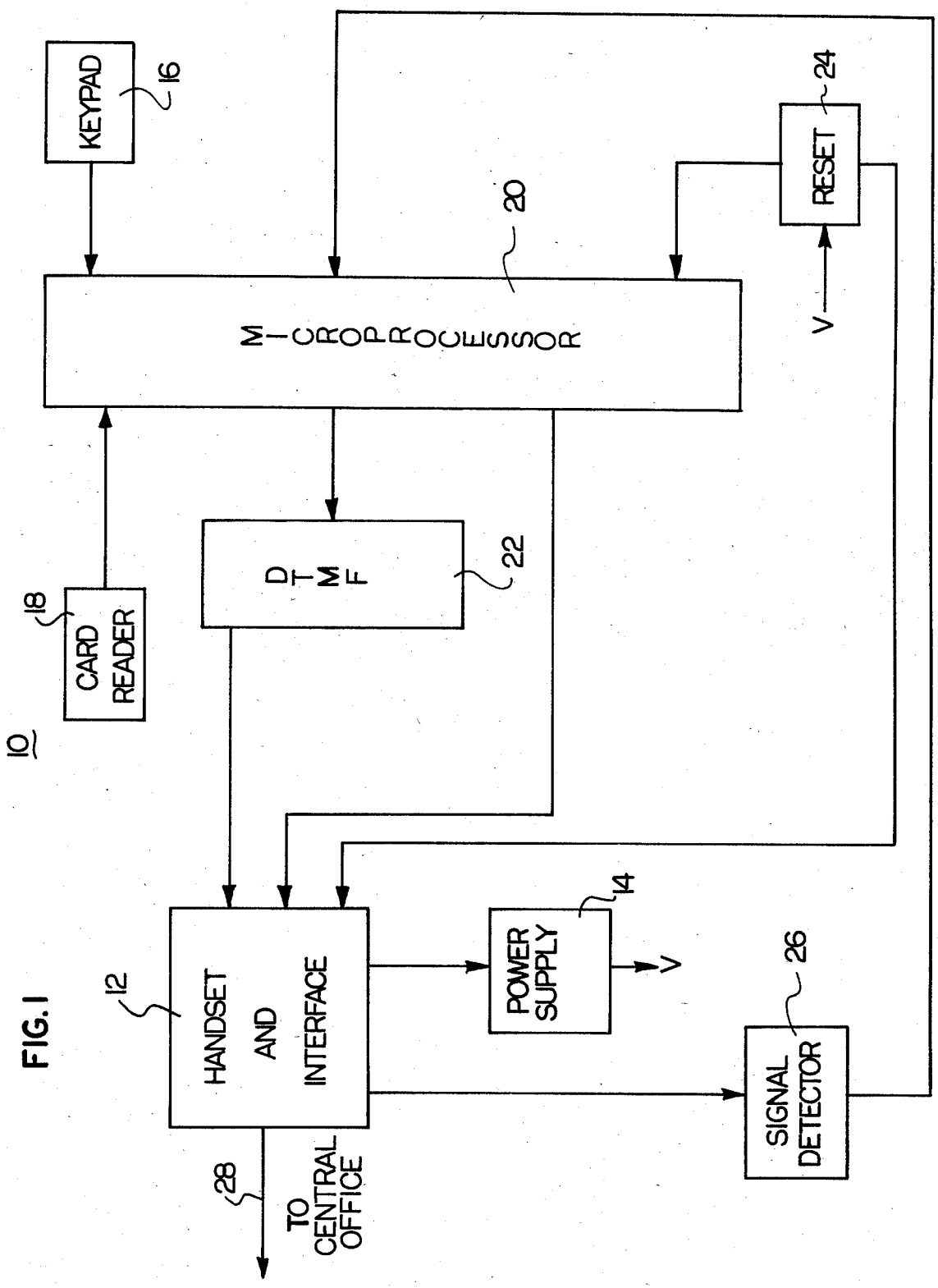
FIG. 1 is a block diagram illustrating one embodiment of the present invention.

Referring to FIG. 1 there is shown a block diagram for the central office powered credit card only paystation 10 of the present invention. The paystation includes a handset and interface unit 12 which functions to provide the interface between the paystation and the telephone central office (C.O.) to which it is connected. Unit 12 includes the transmitter and receiver of a standard telephone handset and the standard hookswitch and hybrid circuit ordinarily associated therewith. The hookswitch functions to disconnect the paystation from the C.O. when the handset is on-hook and to connect the paystation to the C.O. when the handset goes off-hook.

Unit 12 also includes an additional or "internal" switch which also functions as a hookswitch. The internal switch which is in the form of a normally closed relay is in series with the standard hookswitch. Under certain conditions to be described hereinafter and with the standard hookswitch in the off-hook position, the internal switch is opened for a predetermined period of time. The paystation is then disconnected from the C.O. for that time in the same manner as if the standard hookswitch was returned to the on-hook position. At the end of that time, the internal switch returns to its normally closed position and the paystation is reconnected to the C.O.

The hybrid functions in a manner well known in the telephone art to isolate the transmitter and receiver of the handset from each other. The hybrid may be implemented by any one of a number of well known embodiments including a transformer. The paystation is connected to the C.O. by the line 28 made up of two conductors which carry the well known designations tip (T) and ring (R).

The paystation 10 is powered solely from the C.O. by the power available on the T and R conductors. When the handset is on-hook, the paystation is disconnected from line 28 and is completely unpowered. When the handset goes off-hook, the paystation is connected to line 28 and the voltage thereacross and current therein can now be used to provide power to the paystation. For this purpose paystation 10 includes power supply 14 which develops a voltage V when the hookswitch is closed by the handset going off-hook. The voltage V appears as an input to those blocks of FIG. 1 which have yet to be described but has, for ease of illustration, been omitted in all cases except for reset circuit 24 whose function will be explained hereinafter. Supply 14 may be implemented by the parallel combination of a zener diode and a relatively large capacitor.

Paystation 10 also includes keypad 16 which is used by the calling party as means to enter dialing information into the paystation. Keypad 16 is conventional in nature and may be arranged in the well known four row and three column configuration. In that configuration the keypad has twelve keys in total, ten of which are associated with a respective one of the digits zero (0) through nine (9) with the remaining two keys associated with the asterisk (*) and the sound sign (#). For a keypad having four rows and three columns the particular one of the keys being depressed at any given instant of time may be identified by the combination of two binary digits (bits), one of which identifies the row and the other of which identifies the column in which the depressed key is located. A total of seven (7) bits is all that is necessary to identify the four rows and three columns.

As paystation 10 allows only credit cards to be used as the form of payment for non-free calls made therefrom, the paystation includes card reader 18. The credit card may be those issued specially by the telephone company or O.C.C. which owns the paystation or may be one of the kinds issued by a local bank or credit company but usable nationwide. In any case, the card would have on its reverse side a magnetic stripe on which various pieces of information are encoded. The stripe is made up of a number of tracks and by preestablished convention track two (2) of the stripe contains encoded thereon a number which is unique to the card holder as well as other data to be described hereinafter.

Reader 18 is used to read track two of the card and is of the hand activated type. In particular, reader 18 may have a slot into which the card is inserted in a predetermined manner. The card holder then causes the card to be swiped past a head contained in reader 18 for reading track two. The slot serves to align the magnetic stripe on the card with the read head to insure proper reading of the data encoded on the track. Such a hand activated magnetic card reader of the type described above is commercially available from any one of a number of vendors of such equipment. One such vendor is SRD Corporation of El Segundo, CA.

Figure 2:
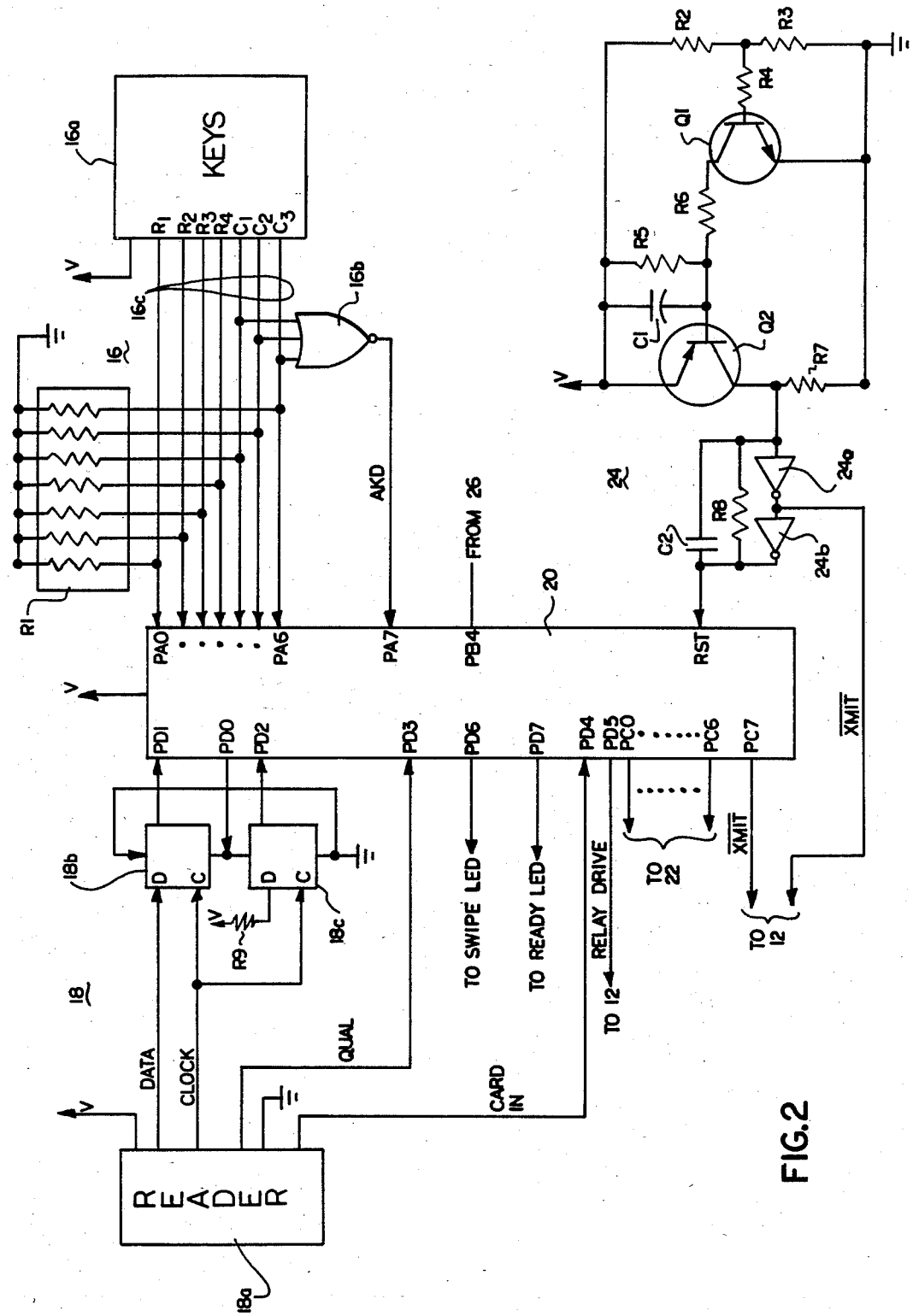
FIG. 2 is a schematic diagram showing circuits for various ones of the blocks of FIG. 1.
Figure 3A:
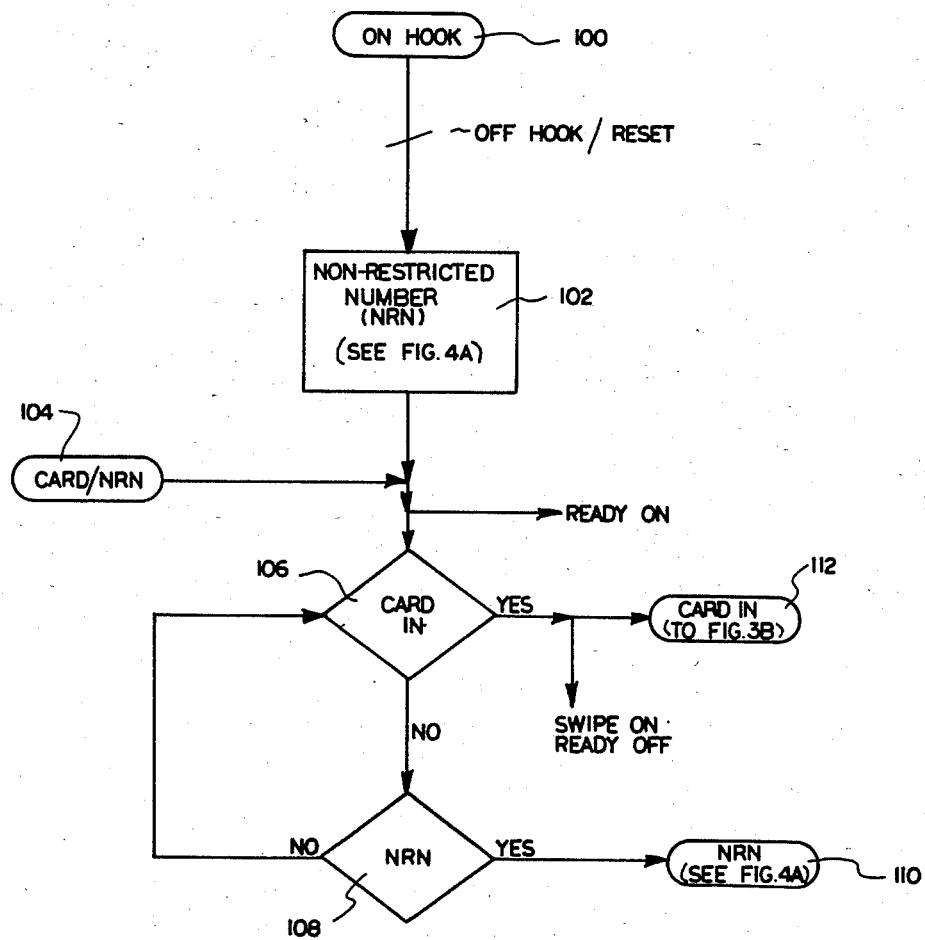
FIGS. 3A to 3C are a flow diagram of the program utilized in the embodiment of FIG. 1.
Figure 3B:
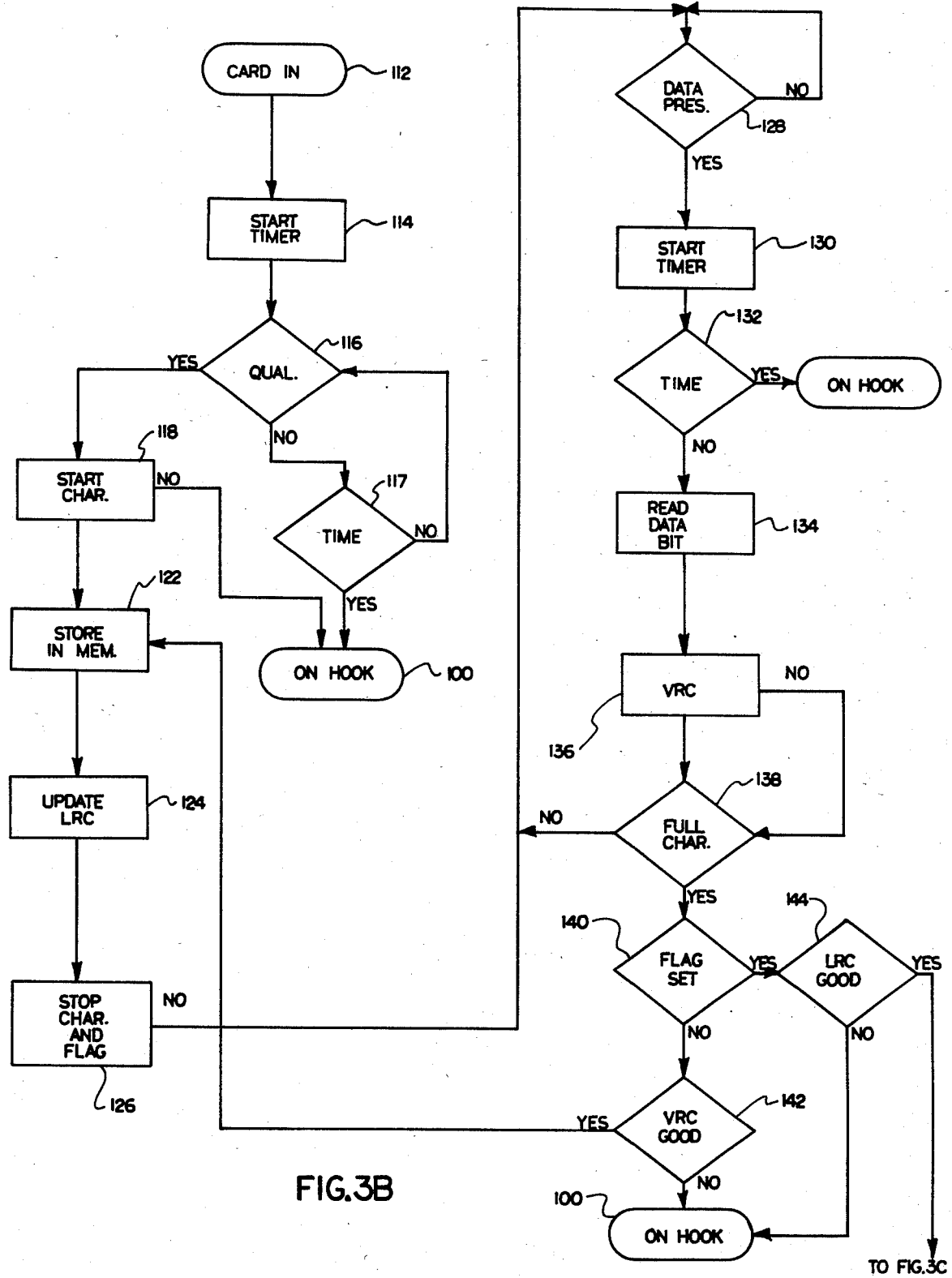
Figure 3C:
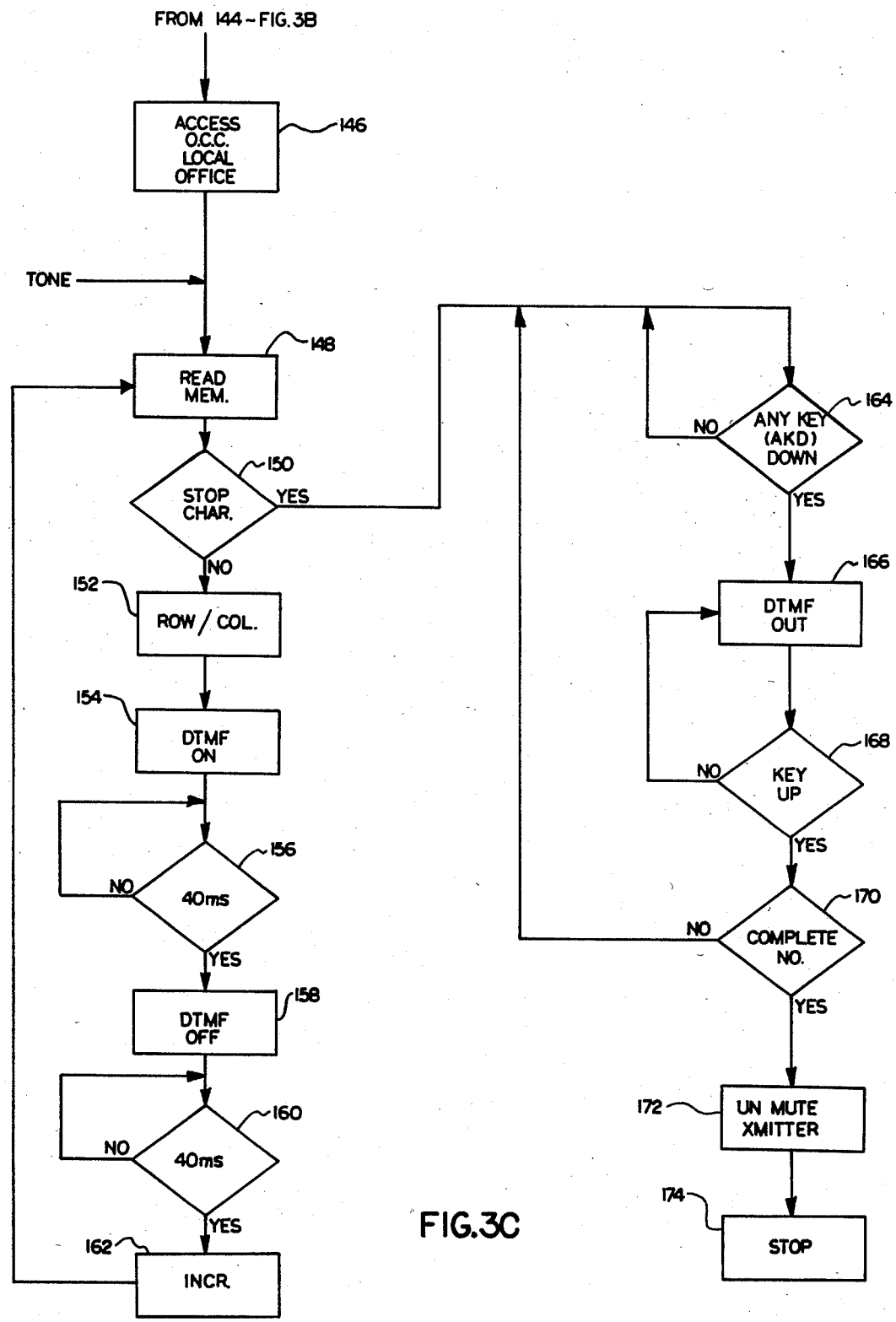

For the purposes of controlling its operation, paystation 10 includes microcomputer (mcu) 20. The mcu, a detailed circuit schematic for which is shown in FIG. 2, is programmed to handle the data read by reader 18 from the credit card and dialing information entered by the paystation user through keypad 16. The mcu is also programmed to open the internal switch in unit 12 upon the occurrence of one of a number of predetermined conditions. A detailed flow chart for the program stored in the mcu is shown in FIGS. 3A to 3C to be described hereinafter.

Under the control of its program the mcu stores the data either read from track two of the card or entered by the user and uses the same to control the generation of dual tone multifrequency (DTMF) signals by DTMF generator 22. The tones generated by circuit 22 are connected to line 28 by interface circuit 12. Generator 22 may be implemented in any one of a number of embodiments well known in the art. The particular form in which the generator is embodied is dependent on the information outputted by the mcu to the generator. Where the information outputted by the mcu is in the form of row and column information, then generator 22 may be implemented by using a type S2559E chip available from American Microsystems, Inc. of Santa Clara, CA.

As in any telephone instrument which transmits tones to its associated C.O., the tones are heard in the receiver of the instrument by the user. In order to reduce the amplitude of the tone signals in the receiver to a level acceptable to the user, it is necessary to electronically attenuate the level to the receiver each time a pair of tones are generated. The S2559E chip includes an output designated as "MUTE" which provides a usable output signal each time a pair of tones are generated. The MUTE signal may be connected to the base of a transistor which is itself connected in parallel with the receiver of the handset. Each time generator 22 develops a MUTE signal the transistor conducts to thereby shunt the receiver. The tones heard in the receiver are thereby reduced to an acceptable level.

As described above, handset 12 includes a transmitter. The transmitter, as is well known in the art, converts the speech signals of the paystation user into electrical signals for transmission to the C.O. The transmitter requires current for its operation. If the paystation were connected to a local source of power such as a public utility, the transmitter could be left connected to the hybrid at all times the handset was off-hook. As the paystation of the present invention is powered solely from the C.O., the current available to power the entire paystation is limited to a maximum of approximately 20 ma. It is, therefore, desirable to disconnect the transmitter from the hybrid at all times other than when the user has established a connection through the C.O. to the telephone of the party he is calling. The connection of a transistor which acts as a switch in series with the transmitter allows the transmitter to be disconnected from the hybrid when the transistor is nonconductive. During dialing the mute signal provided by generator 22 may be used to disconnect the transmitter. The manner in which the transmitter is disconnected at other times will be describe hereinafter.

Power to operate paystation 10 is supplied solely from the C.O. Power supply 14 takes some time to generate the voltage V following the connection of the paystation to the C.O. Therefore, it is desirable to hold mcu 20 reset for a predetermined period following each lifting of the handset from the hookswitch. This holding of mcu 20 reset is provided by reset circuit 24. Circuit 24 responds to the voltage generated by supply 14 to hold the mcu reset for about one (1) second after the hookswitch is first closed in the manner described above. During this time interval, the mcu is unusable and the user of the paystation is unable to use the keypad to enter dialing information. This does not, however, restrict or otherwise impair the usefulness of the paystation in that it takes about one second for the user to bring the receiver of the handset in contact with his ear after it is lifted off the hookswitch. The mcu is also held reset by circuit 24 following any other operation of the hookswitch as occurs when the user operates the hookswitch by hand to momentarily break the connection with the C.O. Finally, the mcu is also held reset by circuit 24 after the internal switch in unit 12 returns to its normally closed position.

During the reset time interval, it is also desirable for the reasons described above to have the transmitter disconnected from the C.O. line. Reset circuit 24, therefore, provides a signal to handset and interface circuit 12 which accomplishes this result during the reset time interval. Finally, it is also desirable to have the transmitter disconnected from the C.O. line at all times other than when it may be needed to transmit the users speech signals. This desirable result is accomplished by mcu 20 which provides a suitable signal to circuit 12 for this purpose. Therefore, circuit 12 receives three signals, any one of which would be sufficient to disconnect the transmitter. These signals are from mcu 20, DTMF generator 22 and reset circuit 24. Circuit 12 must, therefore, include suitably arranged logic such as an OR gate which allows it to use any one of the three signals to disconnect the transmitter. Thus, when the hookswitch is closed, the transmitter is disconnected from the C.O. line except when a connection has been established through the C.O. to the telephone of the party being called.

Lastly, paystation 10 includes signal detector circuit 26 which is used to detect signalling information transmitted from the C.O. to the paystation. The program in the mcu looks for the detection of this signalling information. For example, after the data read on track two of the card has been stored in the mcu, the mcu may then under control of its program, contact the C.O. In response thereto, the C.O. may then transmit a signal in the form of a tone of predetermined frequency. Upon detection of that tone by circuit 26, the mcu may then be caused to transmit the credit card data to the C.O. Where the signal is in the form of a tone, detector 26 may be implemented in the form of a bandpass filter followed by a comparator. The filter is used to detect the tone and the comparator is used to provide the logic level input to the mcu which indicates that a tone has been detected.

Interface circuit 12 includes therein a transformer, the primary winding of which is connected by the hookswitch to the T and R conductors of the C.O. lines. The dual-tones of DTMF generator 22 appear on this primary winding for transmission to the C.O. The secondary winding of the transformer is connected to detector circuit 26 and the signalling information from the C.O. appears first on the primary winding and then by transformer action on the secondary winding. Where signalling information is in the form of a tone, that tone must have a frequency which is substantially different from any of the dual-tone frequencies transmitted to the C.O.

Referring now to FIG. 2, there is shown a block-schematic diagram for mcu 20, keypad 16, card reader 18 and reset circuit 24. The mcu may be implemented by using any one of a number of commercially available microcomputers which meet the low power consumption requirements of the present invention. One such unit is the MC146805, a member of the M6805 family of microprocessors manufactured by Motorola, Inc. of Schaumburg, Ill. For ease of description, it is assumed that mcu Z0 is embodied by the Motorola unit described above. Therefore, the designations shown in FIG. 2 for the various inputs and outputs to mcu 20 are those actually used for the above described unit.

Keyboard 16 includes the actual keys 16a arranged in a four row by three column configuration and an array of seven resistors collectively designated as R1. The keys are connected to receive the voltage V from power supply 14 and have outputs which are connected by the seven lines designated collectively as 16c to the inputs designated as PA0 through PA6 of mcu 20.

The key depressed by the paystation user can be uniquely identified by providing to the mcu the row and column in which that key is located. Four of the seven outputs from 16a are, therefore, uniquely associated with a respective one of the four rows in the keyboard and the remaining three outputs are uniquely associated with a respective one of the three columns in the keyboard. Each of the sever resistors in R1 are associated with a respective one of the outputs of 16a and are connected thereto by the associated one of the lines 16c. The four row outputs of 16a are connected to an associated one of the four inputs PA0 through PA3 respectively of mcu 20 whereas the three column outputs are connected to an associated one of the three inputs PA4 through PA6 of the mcu. A three input NOR gate has its inputs connected to a respective one of the three column outputs of 16a and its output connected to that input of the mcu designated by PA7.

The seven resistors in R1 are not only connected to an associated one of the seven lines 16c, but are also connected to ground. With none of the keys in 16a depressed, the seven resistors hold the inputs PA0 through PA6 low. When the user depresses one of the keys, it causes the associated one of the four row outputs and the associated one of the three column outputs to be connected to the voltage V. Those two of the inputs PA0 through PA6 associated with the row and column of the depressed key, therefore go high. For example, if the user depresses the key marked number "1", the R1 and C1 outputs of 16a are connected to V and the PA0 and PA6 inputs of mcu 20 become high.

When the user depresses any one of the keys, the respective one of the three column outputs of 16a goes high, therefore, causing the gate 16b to generate a signal designated as AKD (any key down) to the mcu. Therefore, when a key of the keyboard is depressed, the mcu receives three input signals; one of which indicates that one of the twelve keys has been depressed and the other two of which indicates the particular one of the keys that has been depressed. The manner in which the mcu utilizes this information will be described in more detail with respect to the flow charts of FIG. 3.

Card reader 18 includes reader 18a and the synchronizing circuitry made up of the D type flip-flops 18b and 18c. Reader 18a includes a switch (not shown) which is closed when the card is inserted in the slot of the reader. That condition is transmitted by the reader to the mcu and appears as the signal designated as "CARD IN" at input PD4 of the mcu. In response thereto, the mcu transmits from output PD6 a signal to light a light emitting diode (LED) designated as "SWIPE" on the front panel of the paystation. This LED indicates to the user that the credit card may now be swiped or slid past the head contained in the reader for reading the magnetic stripe on the reverse side of the card.

As described in connection with FIG. 1, the reader reads track two of the stripe. By convention, track two contains digital data unique to that card holder. This data is transmitted along with the clock signal developed by the reader over the lines designated as DATA and CLOCK respectively to flip-flop 18b. The clock signal is also transmitted to flip-flop 18c. This data then appears at the input PD1 to the mcu from flip-flop 18b. Flip-flop 18c is connected to provide a signal indicating data is present to input PD2 of the mcu and output PD0 of the mcu provides a signal to clear both of the flip-flops.

Track two also contains recorded thereon a signal which should be read by reader 18 prior to the reading of the credit data recorded on the track if the card is correctly inserted in the slot of the reader. This signal known as the "qualifier" is transmitted to input PD3 of the mcu over the line designated as QUAL. The qualifier signal is used to indicate to the mcu that credit card data will be forthcoming from reader 18a. The qualifier signal is also used by the mcu to turn off the SWIPE LED. This turning off of the LED allows the limited current available at the paystation to be used in allowing the reader to read the credit data and transmit it to the mcu.

Reset circuit 24 as described in connection with FIG. 1 provides a signal to the reset (RST) input of the mcu which hold the processor reset for about one second after the hookswitch of the paystation is first closed. This reset interval allows power supply 14 enough time to build the voltage V up to the level which is sufficient to provide power for the operation of the mcu and other elements of the paystation.

In order to provide this predetermined reset interval circuit 24 includes N-P-N transistor Q1 and P-N-P transistor Q2. With the handset on-hook, both Q1 and Q2 are nonconductive. When the handset goes off-hook, the increasing voltage generated by supply 14 is applied directly to the emitter of Q2 and through the combination of the resistors R2 and R4 to the base of Q1. The transistor Q1 remains nonconductive for some period after the handset first goes off-hook. When Q1 becomes conductive, it causes Q2 to turn on to thereby generate a pulse to the RST input of the mcu. This pulse is connected to the RST input by the series combination of inverters 24a and 24b. Inverter 24a has its input connected to the collector of Q2 and inverter 24b has its output connected to the RST input. The parallel combination of a capacitor C2 and a resistor R8 are connected between the collector of Q2 and the RST input.

Upon receipt of the pulse at its RST input, the mcu transmits from its output PD1 a signal to light the LED designated as "READY." The lighting of this LED tells the user that the paystation is now powered up and ready to receive either the credit card in reader 18 or possibly certain types of dialing information through keypad 16. The types of dialing information which may be entered at this time will be described more fully in connection with FIG. 4.

Finally, reset circuit 24 also provides the signal which will keep the transmitter of the handset disconnected during the powering up interval. That signal designated as $\overline{\text{XMIT}}$ is provided by circuit 24 from the junction between the output of inverter 24a and the input to inverter 24b. It is also desirable to disconnect the handset transmitter at all other times except when a connection has been established with the telephone of the party being called. As described previously, the DTMF generator 22 provides such a signal when it is generating dualtone signals to the C.O. The generator is connected to the outputs designated as PC0 through PC6 of the mcu. The mcu provides at its output PC7 a signal to circuit 12 also designated as $\overline{\text{XMIT}}$ which disconnects the transmitter at all other times when it is desirable for it to be disconnected from the handset.

Lastly, the mcu provides at its output PD5 a signal designated as RELAY DRIVE, which is used to open the normally closed relay in unit 12 which acts as the internal switch. Upon the occurrence of one of the conditions to be described in connection with FIGS. 3 and 4, the mcu provides the RELAY DRIVE signal to energize the relay and thereby open the switch. A circuit (not shown) consisting of one or more transistors is included in interface unit 12. This circuit responds to the RELAY DRIVE signal to energize the relay. A large capacitor located in power supply 14 provides the energy for energizing and holding the relay in the open position.

The opening of the switch disconnects the paystation from the C.O. in the same manner as if the standard hookswitch were returned to its on-hook position. As will be described hereinafter, the program sequences in the mcu for operating the internal switch function only when the handset is off-hook. When the capacitor which supplies the energy for holding the relay open has discharged to the point where it can no longer hold the relay open, the internal switch returns to its normally closed position. The paystation is then reconnected to the C.O. As the opening of the internal switch has disconnected the paystation from its source of power, it is necessary upon the closure of that switch for the paystation to undergo the reset time interval described above.

In FIGS. 3A to 3C there is shown a flow chart for the program stored in the mcu. This program allows the mcu to control the operation of the paystation from the time the paystation is first connected to the C.O. until such time as the user dials the last digit necessary to reach the party being called.

Ordinarily the paystation is used in combination with the users credit card to allow the user to place a telephone call for which he will be billed on his credit card account. It is also desirable that the user be able to place certain calls such as local and long distance information and emergency numbers without having to use a credit card. The telephone numbers that may be so dialed will be referred to hereinafter as non-restricted numbers (NRN's). The NRN's that may be dialed are stored in the mcu and their dialing is controlled by the program. For ease of description of the program it has been decided, however, to separately describe in connection with FIGS. 4A to 4C those portions of the program which control dialing of the NRN's and in FIGS. 5A to 5C circuitry and a method by which they may be loaded into the mcu. In order that the interrelationship of those parts of the program to the entire program be completely understood, the flow charts of FIGS. 3A to 3C include a number of blocks which each bear the label NRN. These blocks show those locations in the program where the NRN related portions occur. Referring now to FIG. 3A, there is shown the first part of the flow chart. In describing the operation of the program it is assumed that the handset of paystation 10 is initially on-hook 100. The user lifts the handset causing the hookswitch to go to its off-hook position. The paystation is connected to the C.O. and circuit 24 provides the one (1) second reset described previously. At the end of that time interval the signal provided by circuit 24 is removed from the RST input of the mcu (See FIG. 2). The program then enters step 102 which is associated with the downloading of the NRN's from the read only memory where they are stored to the random access memory. At the end of that step the mcu then lights the READY LED.

The program then enters into a loop which involves a number of decision steps 106, 108 based on input to the mcu from the user or lack thereof. The program will remain in this loop until such time as user has provided one of a number of predetermined inputs to the paystation.

Figure 4A:
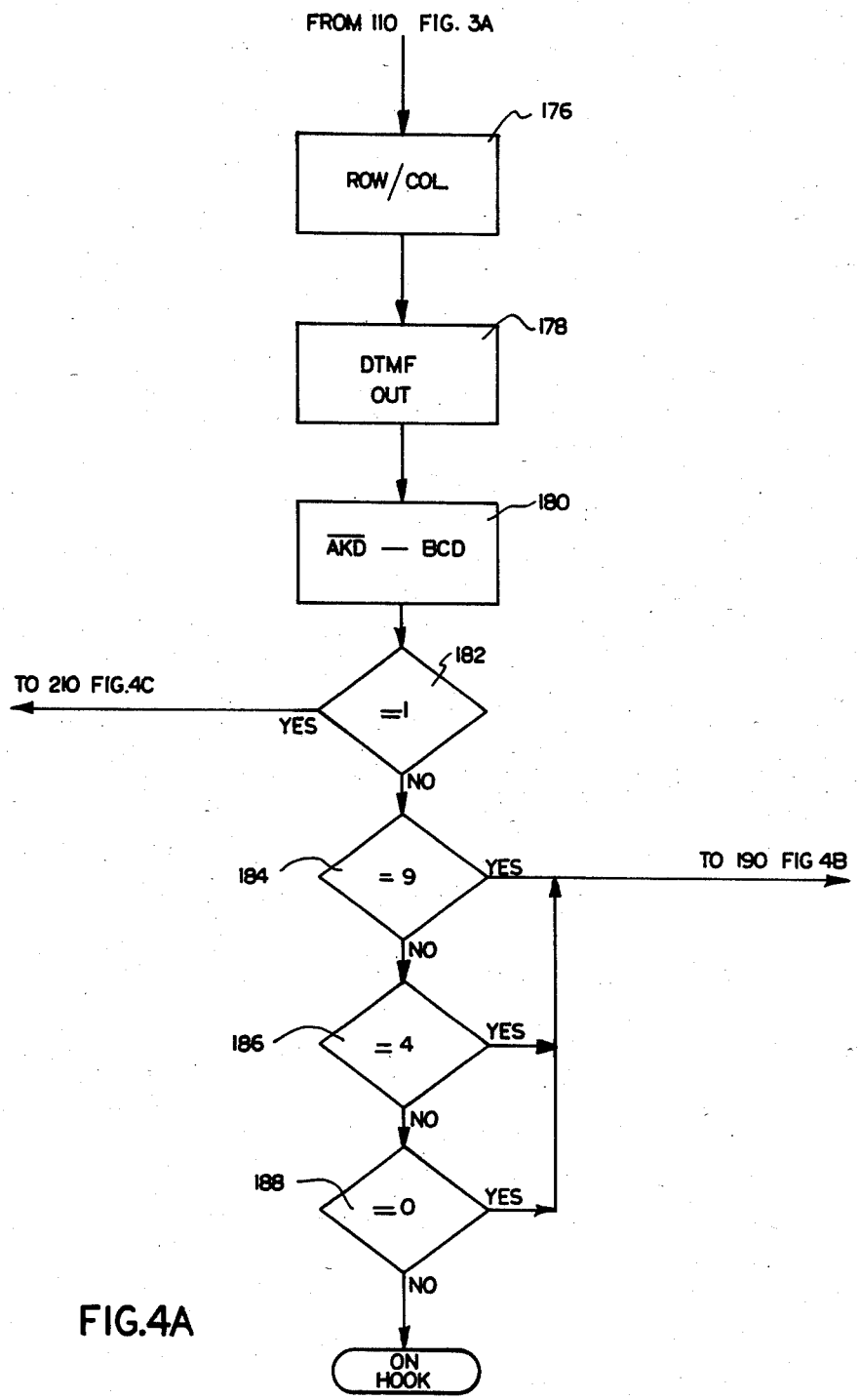
Figure 4B:
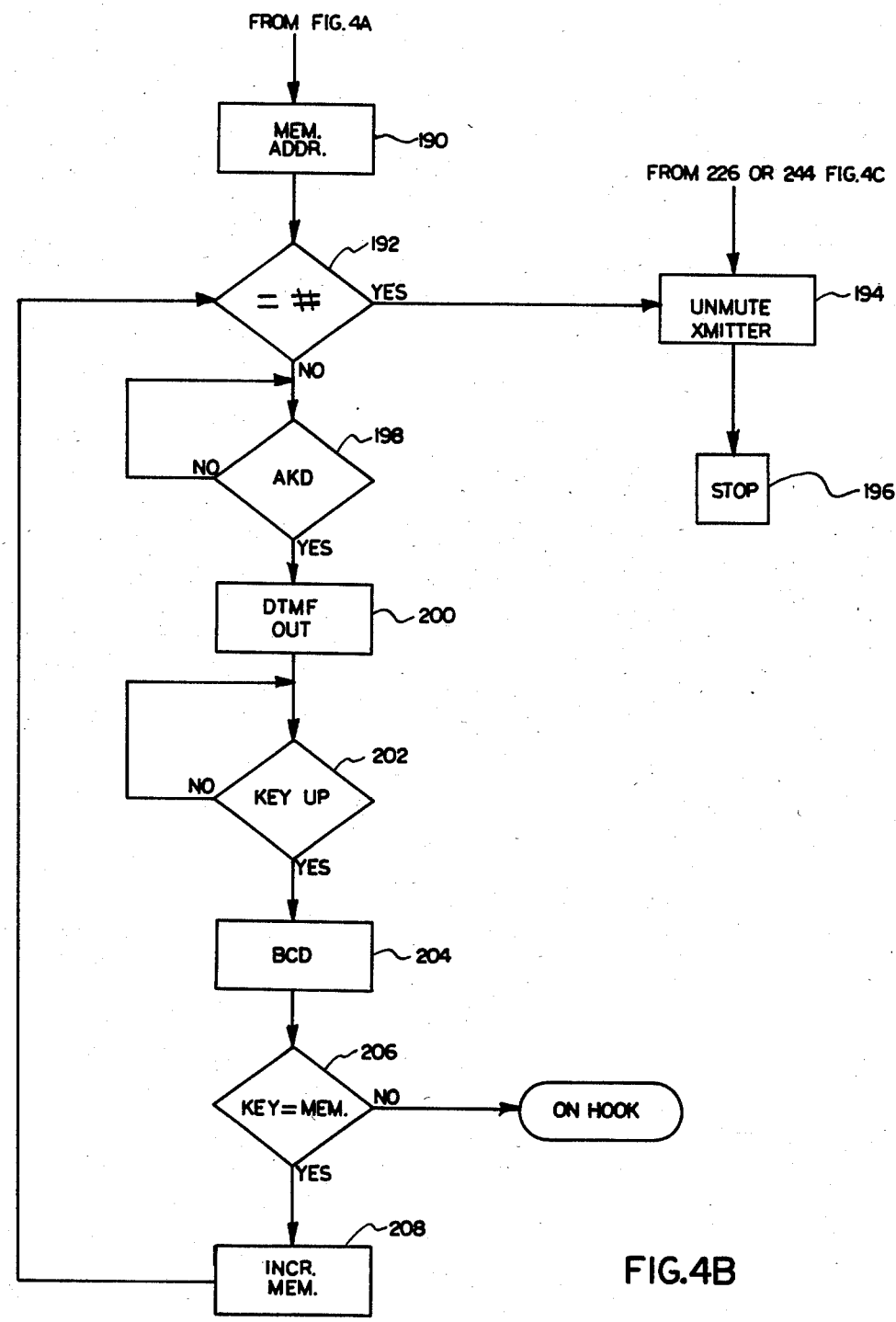

If the user input is associated with the NRN's the decision step 108 associated therewith causes the program to branch to step 110 which is associated with those numbers. The flow chart for those instructions is shown in FIGS. 4A to 4C to be described in more detail hereinafter. If the user input is in the form of inserting his credit card in reader 18 the program decision step 106 associated therewith causes the mcu to turn the READY LED off and light the SWIPE LED. The program branches to step 112 associated with the reading of the credit data in the card. For purposes of describing FIGS. 3A to 3C, it is assumed that the user has inserted his credit card in the reader.

Referring now to FIG. 3B there is shown the series of steps associated with reading of the credit card. The program by step 114 first sets and starts a timer. The timer is set to a time in the order of from three (3) to five (5) seconds. This is the time allowed to read the qualifier signal recorded on the credit card. The program then continues on to a number of decisions (steps 116 and 117). One of those decisions (step 116) is associated with the reading of the qualifer signal. The other of those decisions (step 117) is associated with the timing out of the timer.

If the qualifier is read before the timer has timed out, the program then branches to step 118 which is associated with reading the first character on the credit card's magnetic stripe. This character is known as the START character and has a predetermined format. The reading of this character is described in more detail below. If the timer should time out before the qualifier has been read, then the program causes the mcu to transmit a signal to open the internal switch in unit 12. The operation of this switch causes the paystation to momentarily go on-hook in the same manner as if the user had operated the standard hookswitch. When the internal switch returns to its normally closed position the paystation is reconnected to the C.O. The program then returns to the beginning of FIG. 3A in the same manner as if the handset had just been lifted off-hook.

Assuming that the qualifier has been read and the timer has not yet timed out, the program then executes step 118 to read the START character. This step while shown in FIG. 3B only as a single block includes instructions which look for the data present signal on mcu input PD2 and the actual data bits on mcu input PD1 (See FIG. 2). The step 118 also contains a decision instruction which determines if a predetermined number of bits have been read. If by those number of bits the START character has not been read, the program then causes the internal switch to be energized and the paystation goes on-hook. If both the predetermined number of bits and the START character have not yet been read, the program continues to read the data on the card until the first to occur of reading the START character or reaching the predetermined number of bits.

When the START character is read before the predetermined number of bits has been reached, the program then executes a series of steps 122, 124, 126. These steps store the character in memory, update a register which stores information regarding the quality of the data read off the magnetic stripe and check to see if the character read has a predetermined format.

The information stored in the register by step 124 is in the form of a longitudinal redundancy character (LRC). As each character starting with the START character is read off the stripe, it is exclusively OR'ed with the previously read character. The results of this operation are stored in the register. The last character on the stripe is the LRC. When it is read it is compared to the character stored in the memory. If the two characters agree, this is then one check to indicate that the data has been correctly read from the stripe. Step 126 checks the characters read off the stripe to determine if they are the STOP character. This is a predetermined character which indicates the end of the data on the stripe. When the STOP character is read step 126 sets a flag indicative of the same.

The program then continues on to a series of steps 128, 130, 132, 134 which allow the mcu to process the bits of the characters following the START character on the stripe. It is these characters which are the user's credit card number. By step 128 the program checks to see if the data present signal is at input PD2 of the mcu. If that signal is present, the program then sets by step 130, a timer. The timer is set to a predetermined time which is the same for reading each data bit from the card. The program then continues on to step 132 to determine if the timer has timed out. If that is the case, the mcu then causes the internal switch to be energized thereby momentarily disconnecting the paystation from the C.O.

If the timer has not timed out, the program then proceeds to step 134 wherein the data bit present on input PD1 is read into the mcu. The program then proceeds to a series of steps 136, 138 in the form of a loop. These steps function to check the parity of the data being read (step 136) and also to determine if the entire character has been read (step 138). The parity is checked by the use of the well-known vertical redundancy check (VRC). Typically, each character recorded on the stripe is five (5) bits (four (4) data bits plus one (1) parity bit). If the entire character has not yet been read, the program returns to step 128 to continue the reading into the mcu of the bits in that character.

If by step 138 the mcu determines that the entire character has been read, the program then proceeds to step 140 to determine if the STOP character flag has been set. If the flag has not been set, this indicates that there are additional characters on the stripe to be read. The program then proceeds to step 142 wherein the VRC is examined to determine if it is good. If step 142 determines that the VRC is in error, this is an indication that an error exists in the data read from the stripe. In that case, rather than continue to read such data, the paystation is momentarily disconnected from the C.O.

If by step 142 it is determined that the VRC is good, the program then returns to step 122. By that step the character read into the mcu is stored in its random access memory. The program then continues in the manner described above to update the LRC register and check for the STOP character.

Let us now assume that the STOP character has been read from the stripe and by step 126 the STOP character flag has been set. In that case when the program executes step 140, it will find that the flag has been set. The program then proceeds to step 144 whereby it will compare the LRC read off the card with the character that has been continuously updated and stored in a register by step 124. If the results of the comparison are that the two characters are not equal, this is an indication that an error has occurred in the data read from the card. In that case the paystation is momentarily disconnected from the C.O. The program then returns to its beginning and allows the card to be read again.

If the result of the comparison is that the two characters are equal, the program then proceeds to the series of steps shown in FIG. 3C. While not shown in FIG. 3B the O.C.C. to whose network the paystation is connected may require that the memory of the mcu remaining after the stripe has been read be filled with a predetermined character. One such O.C.C. requires that the remaining memory be filled with an asterisk (*). The steps necessary to so fill the memory may be executed before the program proceeds to the steps shown in FIG. 3C.

Referring now to FIG. 3C, there is shown the flow chart for that part of the program which transmits the information read from the credit card to the C.O. Also shown is the flow chart for those steps which transmit the dual tones from the paystation to the C.O.

Additionally, where the paystation is connected to the network of an O.C.C. there is also shown in FIG. 3C the step 146 by which the mcu accesses that O.C.C.'s local office. The digits of the telephone number of the local office are stored in the memory of the mcu. These digits are read from the memory one at a time and the mcu provides signals to DTMF circuit 22 so that the dual-tones corresponding to each digit are transmitted to the local office. A predetermined character is stored in memory after the last digit of the telephone number of the O.C.C.'s local office. When the predetermined character is read from memory, the program then knows that the entire telephone number has been dialed. The paystation then waits to receive an answering tone from the local office.

Upon receipt of that tone, the program then enters the series of steps 148 to 162 which allows the mcu to transmit the credit card data to the local office. The manner in which that data is transmitted to the office is in the form of dual-tones. The steps by which the mcu cause circuit 22 to generate the dual-tones is identical to those steps which the program executed in order to allow the paystation to dial the O.C.C.'s local office. These steps will now be described in detail in connection with the transmission of the credit card data to the local office.

The program first executes step 148 whereby it accesses and reads the contents of the first memory location wherein the data previously read from the credit card has been stored. This data is read one character at a time. The program then proceeds to step 150 whereby it determines if the character just read is the previously described STOP character. If the STOP character has not been read, the program then proceeds to execute step 152 whereby two signals are generated to represent the character previously read from memory. These two signals represent the one of four rows and one of three columns on the standard telephone keypad 16 in which the character read is located. These two signals uniquely identify the character.

The two signals appear on the associated two of the seven outputs to PC0 to PC6 of the mcu and are transmitted to the DTMF circuit 22 (step 154). In response to the two signals circuit 22 turns on and generates the unique dual-tones associated with the character. By convention circuit 22 is kept on and therefore generates the dual-tones for 40 milliseconds. The program executes step 156 to determine if that time has expired. Upon expiration of the 40 milliseconds, the program executes step 158 which causes the two signals to be removed from PC0 to PC6. The circuit 22 is turned off and ceases to generate the dual-tones.

By convention during dialing circuit 22 is kept off and therefore does not generate the dual-tones for 40 msecs. The program executes step 160 to determine if that time has expired. Upon the expiration of the 40 msecs off time, the program executes step 162 to thereby allow it to access the next memory location. The program then returns to step 148 to read the contents of that next location. When step 150 determines that the contents of the last read memory location is the STOP character, the program then proceeds to execute step 164 to 174. These steps allow the user to dial the number being called and convert that number into dual-tones for transmission to the C.O. The user is alerted to begin dialing by any one of a number of well-known techniques such as a frequency tone or the lighting of a LED on the paystation.

The user begins dialing by pressing any one of the twelve keys on keypad 16. As described in connection with FIG. 2 the pressing of any key causes the signal AKD (any key down) to appear at input PA7 of the mcu. Step 164 looks for the presence of that signal. When that signal appears on input PA7, the program executes step 166 to generate the dual-tones corresponding to the key depressed by the user. This step 166 is identical to those steps described above for generating the dual-tones corresponding to the credit card data and therefore need not be described further.

Upon determining by step 168 that the key depressed by the user has been released, the program then proceeds by step 170 to determine if the user has dialed a complete telephone number. In the embodiment being described herein it is assumed that the paystation is connected to the C.O. of an O.C.C. which provides only long distance dialing service. Therefore, a complete long distance number consists of either ten or eleven digits depending on whether or not the user must dial a "1" as the first digit. In either case if step 170 determines that a complete number has not yet been dialed, the program returns to step 164 to await the dialing of the next digit.

If step 170 determines that a complete number has been dialed, the program then proceeds to step 172. By this step the mcu removes the signal $\overline{XMIT}$ on its output pin PC7. As previously described, this signal has kept the transmitter of the handset disconnected from the C.O. Now that a complete telephone number has been dialed by the user, the transmitter must be reconnected to the C.O. so that the user can talk to the called party. The program then proceeds to step 174 which places the mcu in a low power stop mode. In this mode the internal clock of the mcu is turned off and the mcu only draws a current in the order of several nanoamperes. This mode therefore allows the limited power available at the paystation to be used for operation of its receiver and transmitter. Also in this mode any further swiping of the card or depressing of the keys of keypad 16 by the user has no effect.

Upon termination of his telephone call, the user disconnects the paystation from the C.O. by placing the handset back on the hookswitch. If the user desires to place another telephone call, he may momentarily disconnect the paystation from the C.O. simply by depressing the hookswitch by hand. When the hookswitch returns to the off-hook position, the program returns to its starting point as shown in FIG. 3A.

Referring now to FIGS. 4A to 4C, there is shown the flow charts for those portions of the program in the mcu which allow the paystation user to dial the NRN's without having to use his credit card. As shown in FIG. 3A (step 102), the NRN's are placed in the random access memory of the mcu as soon as the one second reset has terminated. Also as shown in FIG. 3A, if the user begins to dial rather than insert his credit card, the program by step 108 then branches to those program steps associated with the dialing of the NRN's.

As described, the NRN's are limited to a predetermined set of numbers which usually include the telephone numbers of local information, long distance information, emergency services and the operator. In addition, if the paystation is connected to an O.C.C., the NRN's may also include the toll free number of an office of the carrier. The NRN's associated with long distance information include those associated with information services for telephone numbers located in the same area code as the paystation is located but outside of the local area as well as those of the information services for other area codes. Thus, the program in the mcu must determine if the user is dialing one of the NRN's falling within the predetermined set and if that not be the case, take such action as is necessary to disconnect the paystation from the C.O.

Referring to FIG. 4A, there is shown the flow chart for those steps by which the program determines if the first digit dialed by the user corresponds to one of the NRN's. Each of the NRN's that the user is allowed to dial begins with one of a predetermined set of digits. All long distance NRN's begin with a "1", the emergency NRN begins with a "9", the local information NRN begins with a "4", and the operator NRN begins (and ends) with a "0". In some locations such as Dallas, Tex. local information begins with a "1". For ease of description, that NRN will be included with the long distance NRN's even though it gives access to local information only.

When the user dials the NRN, he depresses the keys of keypad 16. As described above for the dialing of a telephone number which is not an NRN, the particular key depressed is uniquely identified by two of seven possible signals. By step 176, the mcu determines which two of its seven inputs PA0 to PA6 have signals on them. In response thereto, the mcu will provide the output signals to generator 22 to cause the paystation to generate the dual-tones corresponding to the depressed key. Step 178 controls the generation of those tones. The disappearance of the AKD signal at input PA7 allows the mcu by step 180 to determine if the user has released the key that has been depressed. If that is the case, step 180 converts the digit corresponding to the depressed key into a binary coded decimal (BCD).

The program then enters into a series of decision steps 182, 184, 186, 188 by which it determines if the first digit of the telephone number the user is dialing begins either with a "1", "9", "4" or "0". If that digit is not one of the above four digits, this is an indication that the user is attempting to dial a number which is not an NRN. In that case the program causes the mcu to operate the paystation's internal switch to thereby momentarily disconnect the paystation from the C.O.

If the program determines that the digit dialed by the user is one of the four digits described above, the program then proceeds to execute a series of instructions based on which digit has been dialed. If the digit dialed is either a "9", "4" or "0", this is an indication that the user is dialing a local NRN. The program then executes the series of steps shown in FIG. 4B. If the digit dialed is a "1", this is an indication that the user is dialing a long distance NRN. The program then proceeds to execute the series of steps to be described in connection with FIG. 4C.

Referring now to FIG. 4B, there is shown the flow chart for the series of steps the program executes when the user is dialing a local NRN. There are certain specific locations in the mcu's memory in which the local NRN's are stored. The program then executes step 190 by which it addresses the first location in memory associated with the local NRN that the user is dialing. By step 192 the program then determines if that location contains the sound sign (#). Each of the NRN's 30 stored in memory ends with the #. When the user dials as his first digit a "0" the next memory location contains the # as the "0" is all that need be dialed in order to have access to the operator. In that case the program then proceeds to execute steps 194 and 196 by which the transmitter is connected to the C.O. and the mcu is placed in a low power stop mode.

If by the step 192 the program determines that the next location in memory does not contain the #, this is an indication that other digits must be dialed in order to complete the local NRN. The program then executes the series of steps 198, 200, 202, 204, 206 and 208 which with step 192, form a loop. By this loop the program looks for the next digit to be dialed by the user (step 198); provides the signals by which circuit 22 can generate the dual-tones corresponding thereto (step 200); determines if the user has released the key (step 202); converts the two signals from the keypad into a BCD (step 204); compares the dialed digit to that stored in memory (step 206); and proceeds to address the next memory location if the dialed digit and the digit stored in memory are the same (step 208).

If by step 206 the program determines that the dialed digit and the one stored in memory are not the same, this is an indication that the user is not dialing a legitimate NRN. In that case the mcu causes the internal switch to be operated to thereby momentarily disconnect the paystation from the C.O.

When by step 192 the program determines that the next memory location contains the #, it then executes steps 194 and 196 to reconnect the transmitter and place the mcu in a low power mode.

Referring momentarily once again to FIG. 4A, if by step 182 the program determines that the first digit dialed by the user is a "1", this is an indication that the user is dialing a long-distance NRN. In that case the program executes the series of steps shown by the flow chart of FIG. 4C. By these steps the program must determine which long distance NRN is being dialed by the user. As there are only a limited number of such NRN's which may be dialed, it is desirable that the program initially identify which one of the NRN's is being dialed and then branch to those memory locations which contain that NRN.

One technique for determining which NRN is being dialed is to look at the next three digits that are dialed following the dialing of the "1". These three digits may be either "555" for in-area code non-local information; "800" for the toll free number of the O.C.C. to which the paystation may be connected; "411" for the previously described requirement that in certain locations access to local information requires that a "1" be first dialed or any area code for access to long distance information. The three digits when exclusively or'ed together give rise to a result which can be used in conjunction with the checking of various ones of the three digits to determine which NRN the user is dialing. The manner and steps by which the program makes this determination will now be described.

By steps 210, 212 and 214 the program enters each digit into the mcu as the user depresses the associated key and also allows the dual-tones to be generated to the C.O. These steps are identical to previously described steps 198, 200 and 202 of FIG. 4B and, therefore, need not be described further. By step 216, each of the next three digits dialed by the user following the dialing of the "1" are exclusively or'ed together. The program then determines by decision step 218 if three such inputs have occurred. If that is not the case, the program continues in the loop made up of steps 210 to 218 until the user has dialed three digits.

When step 218 determines that three digits have been dialed by the user, the program then enters a series of decision steps 220 to 226. By these steps the program will look at the results of the exclusive or'ing of step 216 and in conjunction with ther steps for checking a selected one of the three digits, determine the NRN which the user is attempting to dial.

By step 220 the program compares the results of the exclusive or'ing of step 216 with the character, previously stored in memory, that would arise if the three digits dialed by the user were all "5's". If the comparison indicates that the two characters are identical, this is only an indication that the user may have dialed three "5's". As other combinations of three digits may give rise to the same result, the program must further check the three digits to insure that the user has in fact dialed all "5's". It has been found that if the second digit dialed is a "5", then it is certain that the user has dialed all "5's". This check is performed by decision step 228.

If by step 228 the program decides that the second digit dialed is a "5", then this is sufficient to indicate that the user is attempting to dial the NRN (1-555-1212) associated with in-area code non-local information. In that case, the program then proceeds to step 230 by which the first location in memory wherein the digits 1212 are stored is addressed. The program then proceeds to execute the loop containing the steps 232, 234, 236, 238, 240, 242 and 244. By these steps, the program generates the dual-tones corresponding to the key depressed by the user, compares the digit dialed to that stored in memory and either operates the internal switch if the user has dialed a non-allowed digit or proceeds to the next memory location to thereby look at the next digit that will be dialed unless the next location contains an #. If that is the case, it is an indication that a complete NRN has been dialed and the program then proceeds to execute steps 194 and 196. Steps 232 to 244 are identical to steps 192 to 208 previously described.

Returning now to step 220, if the comparison made by that step shows that the user has not possibly dialed all "5's", the program then proceeds to step 222 by which it detemines if the three digits dialed by the user could possibly be "800". As with step 220, step 222 compares a number previously stored in memory with the results of the operation performed by step 210. If these numbers are equal, this is an indication that the user may have dialed "800".

The program then proceeds to step 246 by which it performs a test to confirm that the user has indeed dialed the above three digits. The test performed by step 246 is to determine if the third digit dialed by the user was a "0". If the third digit was indeed a "0" this is an indication that the user is attempting to dial the NRN associated with the toll free number of the O.C.C. to which the station is connected. By step 248, the program then addresses the first location in the mcu's memory wherein that number is stored. The program then proceeds to execute the previously described loop consisting of steps 230 to 244.

Returning now to step 222, if the comparison made by that step shows that the user has not possibly dialed "800", then the program proceeds to step 224 by which it determines if the three digits dialed by the user are possibly "411". As with step 222, step 224 compares a number previously stored in memory with the results of the operation performed by step 210. If these numbers are equal, this is an indication that the user may have dialed "411".

The program then proceeds to step 226 by which it performs a test to confirm that the user has indeed dialed the above three digits. The test performed by step 226 is to determine if the first digit dialed by the user was a "4". If the first digit was indeed a "4", this is an indication that the user has dialed the three digits "411" and is attempting to contact local information in those locations in the country where a "1" must be first dialed. As these are the only digits that must be dialed in order to make a connection, the program then proceeds to execute steps 194 and 196 to thereby allow the user to obtain such information.

In describing the steps for determining if the user has dialed "555", "800" or "411", it has been assumed that the comparisons made by steps 226, 228 and 246 have shown that the user has dialed the digit that is being tested for. If steps 226 or 228 or 246 show that the particular digit being tested for has not been dialed, this is an indication that the user has dialed three digits which, while not "411", "555" or "800", may correspond to an area code. In a similar manner, if decision step 224 which is executed only after steps 220 and 222 both indicate a noncomparison also gives rise to a noncomparison, this is an indication that the user has probably dialed three digits which, while they probably do not correspond to "411", may correspond to an area code. In any case, a noncomparison which results from the execution of steps 224, 226, 228 or 246 causes the program to execute step 250.

By step 250, the program addresses the first location in memory wherein the NRN for out of area code information (555-1212) is stored. The program then proceeds to execute the loop containing instructions 232 to 244 in the manner described above to ensure that the user is indeed dialing that number.

Figure 5A:
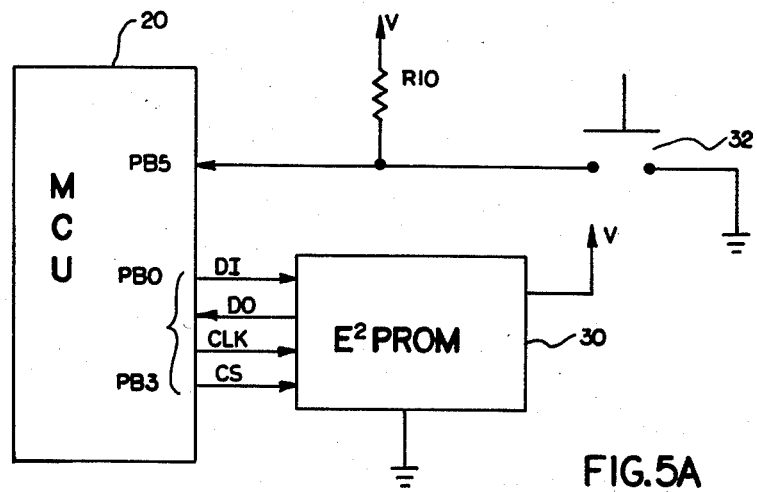
FIG. 5A is a schematic diagram showing circuitry which may be added to the embodiment of FIG. 1 to allow a service person to load non-restricted numbers into the present invention.
Figure 5B:
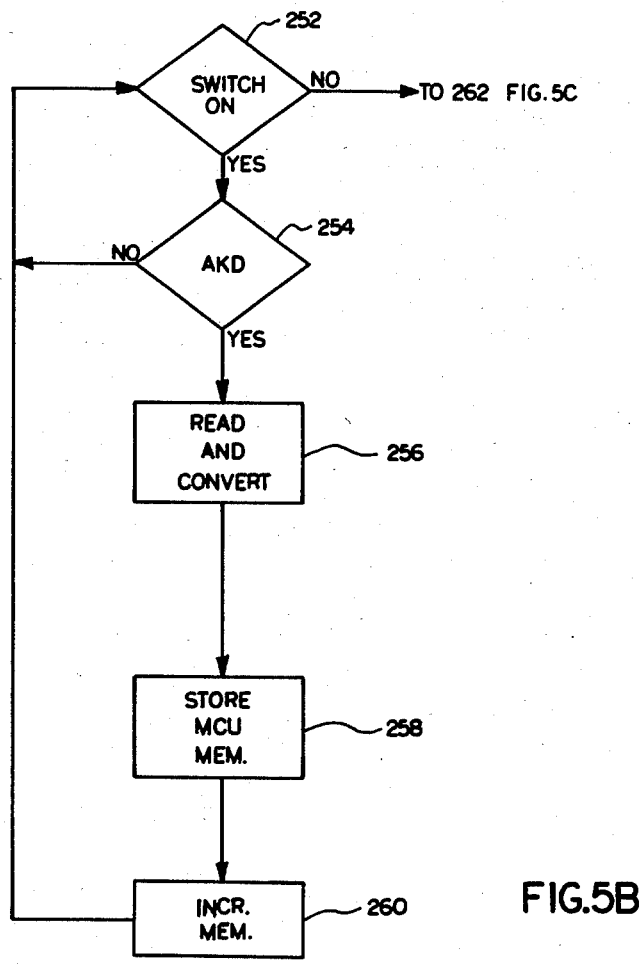
FIGS. 5B to 5C are a flow diagram of those steps which may be added to the program in order to allow such loading.
Figure 5C:
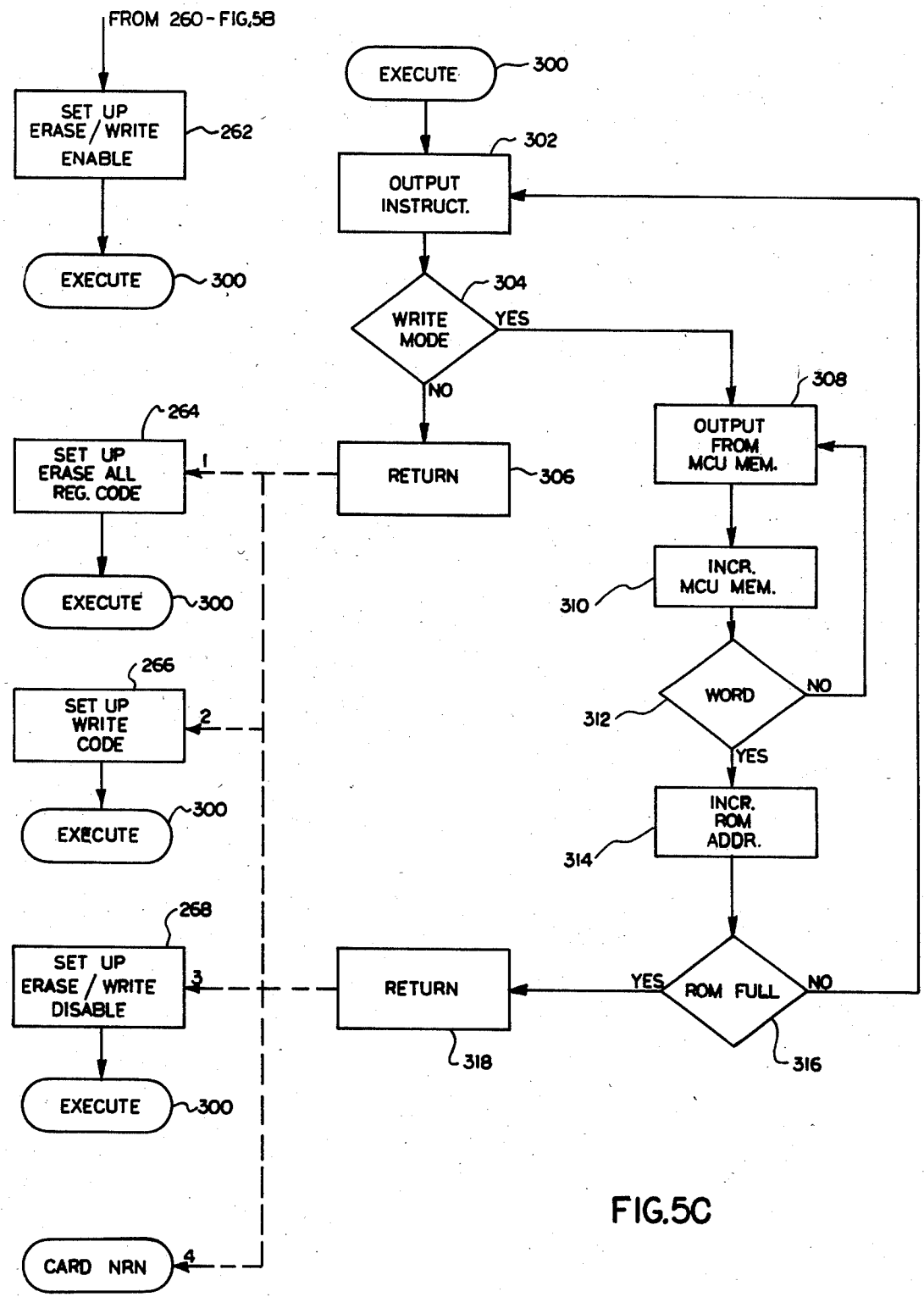

Referring to FIGS. 5A, 5B, and 5C there is shown the circuitry and flow chart of those parts of the program associated with one method of loading the NRN's into the paystation. The NRN's may be placed in the paystation in some permanent manner when the station is first assembled. It may, however, be desirable to be able to change one or more of the NRN's after the paystation has been installed at the location where it will be used. This changing of the NRN's may be accomplished by sending a service person to the paystation. The circuitry and portion of the program illustrated in FIGS. 5A, 5B and 5C allows that service person to accomplish that result.

Referring now to FIG. 5A there is shown circuitry which is added to the paystation to allow the NRN's to be entered into the station by a service person. This additional circuitry consists of an electrically erasable programmable ROM (E$^2$PROM) 30 in which the NRN's are to be stored and a switch 32 which is operated by the service person to cause the program to go to that portion which is used to load the NRN's into the station. Both the E$^2$PROM and the switch are connected to mcu 20. (See FIGS. 1 and 2). For that reason the mcu and the various inputs and outputs to which they are connected are also shown and identified in FIG. 5A. The E$^2$PROM may for example be embodied by the type NMC9306/COP494-256 bit E$^2$PROM which is commercially available from National Semiconductor, Santa Clara, CA. For ease of description it is assumed hereinafter that E$^2$PROM 30 is so embodied.

The E$^2$PROM is connected to three outputs and one input of the mcu as well as to the voltage V and ground. By its connection to output PB0 the E$^2$PROM receives serial data input (DI) from the mcu and by its connection to input PB1 it transmits serial data output (DO) to the mcu. The connection to mcu outputs PB2 and PB3 provides the E$^2$PROM with a serial data clock (CLK) and a chip select (CS) signal, respectively. The switch 32 is connected between input PB5 of the mcu and ground. When the switch is open a resistor R10 having one end connected to the switch and PB5, and the other end connected to the voltage, V provides a signal at input PB5. When the switch is closed the input PB5 is grounded.

The E$^2$PROM has a 256 bit capacity and is divided into 16 registers made up of 16 bits each. It may be erased in its entirety by the use of a single instruction or one bit at a time. Data is read out of or written into the E$^2$PROM in groups of four (4) bits each.

Referring now to FIG. 5B there is shown that portion of the program in the mcu which allows the NRN's to be entered first into the mcu by the service person. To enter the NRN's into the mcu the service person takes the handset of the paystation offhook. This allows the program to be downloaded into the memory of the mcu after the one second delay previously described has timed out. The service person then closes switch 32. While not shown in FIG. 3A the program as is well known to one skilled in the art may include a step for determining if the switch is closed. This step would fall between steps 106 and 108 of that figure.

Returning now to FIG. 5B the flowchart shown therein also begins with a step (252) for determining if switch 32 is closed. It should be appreciated that this step while performing the same function as the step described above is in addition to that step. With switch 32 closed, the program proceeds to step 254 by which it determines if the service person has depressed any one of the keys in keypad 16. When a key is depressed the program then proceeds to execute steps 256, 258, and 260 by which it reads the key that has been depressed into the mcu and converts the same into a binary coded decimal (BCD), stores the BCD in the memory of the mcu and increments to thereby address the next location in that memory.

The program then continues to execute steps 252, 254, 256, 258 and 260 until such time as the service person has loaded the last digit of the last NRN into the mcu. At that time the service person opens switch 32. By step 252 the program determines that the switch has been opened and then branches to the series of steps shown in FIG. 5C for loading the NRN's into the E$^2$PROM.

Referring now to FIG. 5C, the program first executes step 262 by which it sets up the codes which will allow the E$^2$PROM to first be erased in its entirety and then have the NRN's written into it. After executing step 262 the program then proceeds to execute a subroutine 300 by which the erasing of and the writing into of the ROM will be performed.

The subroutine begins by first executing step 302. By this step the instruction which enables the E$^2$PROM to perform an erase followed by a write is set up. By step 304 the subroutine determines that it is not in the write mode and by step 306 the subroutine returns to step 264 of the main program. Thus after being executed one time the subroutine has enabled the E²PROM to undergo a subsequent erase followed by a write.

By step 264 the program sets up the instruction code which will cause the E²PROM to erase its entire contents. The program then returns to subroutine 300. By step 302 the subroutine executes the instruction to thereby erase its entire contents. As the subroutine is not in the write mode it returns by step 306 to step 266 of the main program. Thus after being executed a second time the subroutine has erased the entire contents of the E²PROM. It should be appreciated that the E²PROM is still enabled to write information into its registers.

By step 266 the program sets up the instruction code which will cause the NRN's stored in the memory of the mcu by the service person to be written into the E²PROM. The program then returns to the subroutine. As it is now in the write mode it takes the contents of the mcu memory and writes that data into the E²PROM. This transfer of information occurs in groups of four (4) bits. Each register of the E²PROM has a 16 bit capacity. Therefqre the subroutine executes steps 308, 310 and 312 four times until an entire register has been filled.

By step 312 the subroutine determines if an entire register has been filled. In that case it executes step 314 to thereby address the next register. It then executes step 316 to determine if the entire E²PROM has been filled. The subroutine continues to execute steps 308 to 316 in the manner described above until such time as step 316 determines that the entire E² PROM has been filled. In that case the subroutine has completed execution of its write mode and returns by step 318 to step 268 of the main program. Thus after being executed a third time the subroutine has written the NRN's stored in the memory of the mcu into the E²PROM.

By step 268 the main program sets up the instruction code which will disable the E²PROM from further performing an erase followed by a write. This disabling is necessary to cancel the enabling of those functions which was set up by step 262. The program then executes the subroutine for a fourth time. More specifically, as the subroutine is no longer in the write mode only steps 302, 304 and 306 thereof are executed. As the loading of the NRN's into the E²PROM is now complete the subroutine returns to the main program at step 104 (see FIG. 3A).

There has been described in connection with FIGS. 5A, 5B, and 5C the circuitry and that portion of the program which allows the NRN's to be loaded into the paystation by a service person. It should be appreciated that the portion of the program described above requires that all of the NRN's be loaded into the E²PROM each time any one or more of the NRN's are to be changed. It should further be appreciated that the program for externally loading the NRN's may as is well known to one skilled in the art, be modified such that only those NRN's which are to be changed need be loaded into the E²PROM. This modification would require that rather than erasing the entire E²PROM only those locations in the E²PROM associated with the NRN to be changed need be erased.

It should be appreciated that while the paystation of the present invention has been described in connection with a credit card which has a magnetic stripe on it and a reader adapted to read the same that any sort of means which is capable of carrying encoded credit information and an associated reader may be used in the paystation.

It is to be understood that the description of the preferred embodiment is intended to be only illustrative, rather than exhaustive, of the present invention. Those of ordinary skill will be able to make certain additions, deletions, and/or modifications to the embodiment of the disclosed subject matter without departing from the spirit of the invention or its scope, as defined by the appended claims.

What is claimed is:

1. A credit only telephone paystation having handset and interface means including a transmitter means and a hookswitch for connecting said paystation to a central office by transmission means, said central office being the only and a limited source of power for operating said paystation and providing said limited power to said paystation over said transmission means only when said hookswitch is closed, said paystation comprising:
    (a) power supply means which responds to the providing of power from said central office by generating a voltage;
    (b) information entering means activated by said voltage for reading encoded credit information inserted therein by a user of said paystation and providing in response thereto a first output signal and for allowing said user to enter dialing information and providing in response thereto a second output signal, said credit information representing the number of a credit account to which any telephone calls placed by said user shall be charged; and
    (c) control means, said control means being inactive and being reset and activated by said voltage, said control means being connected to both said information entering means and said handset and interface means, said control means providing, in response to said information entering means first and second output signals, signals representative of said dialing information and said credit information to said interface means for connection to said central office, said control means also providing to said handset and interface means a signal to turn off said transmitter means at all times other than when said control means has determined that said user has dialed a complete telephone number to thereby allow said paystation to operate solely on said central office power.

2. The paystation of claim 1 wherein said control means comprising:
    (i) first means connected to receive said information entering means first and second output signals; and
    (ii) data output means connected to said first means to receive therefrom signals representative of said dialing information and said credit information, said data output means providing in response thereto said signals representative of said dialing information and said credit information to said interface means.

3. The paystation of claim 2 wherein said data output means responds to said representative signals by providing signals in the form of multi-frequency dual tones to said interface means.

4. The paystation of claim 2 wherein said first means includes a microcomputer, said microcomputer being inactive when said hookswitch is open and being reset and activated by said voltage.

5. The paystation of claim 4 wherein said first means further includes reset means which responds to the closing of said hookswitch by resetting said microcomputer for a predetermined interval of time, said microcomputer being activated by said reset means upon the termination of said predetermined time interval.

6. The paystation of claim 4 wherein said microcomputer first receives said information entering means first output signal and then receives said information entering means second output signal.

7. The paystation of claim 6 wherein said data output means first receives from said microcomputer said credit information representative signal and then receives said dialing information representative signal.

8. The paystation of claim 4 wherein said data output means including means for generating said turnoff signal when said user is dialing, said first means further includes reset means which responds to the closing of said hook switch by generating said turnoff signal for a predetermined interval of time and said microcomputer generating said turnoff signal at all of said other times.

9. The paystation of claim 2 wherein said first means first receives said information entering means first output signal and then receives said information entering means second output signal.

10. The paystation of claim 9 wherein said data output means first receives from said first means said credit information representative signal and then receives said dialing information representative signal.

11. The paystation of claim 10 wherein said encoded credit information includes error checking means for checking the correctness of said information entering means first output signal, said first means including means responisve to said error checking means for checking said correctness, said first means providing a signal when said error checking means responsive means determines said output signal is not correct.

12. The paystation of claim 11 wherein said interface means includes normally closed switch means in series with said hookswitch which responds to said first means provided signal by disconnecting said paystation from said central office for a predetermined period of time.

13. The paystation of claim 12 wherein said first means is a microcomputer.

14. The paystation of claim 2 wherein said data output means includes means for generating said turnoff signal when said user is dialing and said first means includes means for generating said turnoff signal at all of said other times.

15. The paystation of claim 14 wherein said first means further includes means which responds to said information entering means second output signal by generating a signal when said user has dialed a complete telephone number to said turnoff signal generating means for turning off said turnoff signal.

16. The paystation of claim 1 wherein said control means includes means for generating said turnoff signal to said handset and interface means.

17. The paystation of claim 16 wherein said control means further includes means which responds to said information entering means second output signal by generating a signal when said user has dialed a complete telephone number to said turnoff signal generating means for turning off said turnoff signal.

18. A credit only telephone paystation for connection to a central office said paystation having handset and interface means including a hookswitch, said paystation comprising:

(a) information entering means for reading encoded credit information inserted therein by a user of said paystation and providing in response thereto a first output signal and for allowing said user to enter dialing information and providing in response thereto a second output signal, said credit information representing the nuber of a credit account to which any telephone calls placed by said user shall be charged;

(b) control means connected to both said information entering means and said handset and interface means, said control means providing, in response to said information entering means first and second output slgnals, signals representative of said dialing information and said credit information to said interface means for connection to said central office, said control means being inactive when said hookswitch is open and being reset and activated when said hookswitch is closed; and (c) readable electrically alterable storage means connected to said control means where said storage means stores a plurality of nonrestricted telephone numbers which may be dialed by said user without having to insert encoded credit information in said information entering means, said control means receiving said plurality of nonrestricted numbers from said storage means and including means which responds to said information entering means second output signal to determine when said user has dialed one of said plurality of nonrestricted numbers and for transmitting said dialed nonrestrictive number to said handset and interface means.

19. The paystation of claim 18 including switch means connected to said control means, said switch means normally being open and capable of being closed to provide a signal to said control means, said control means further including means which responds to said signal to allow information entered through said information entering means to be written into said storage means whereby at least one of said plurality of nonrestricted telephone numbers may be changed.

20. The paystation of claim 18 wherein said paystation is connected to said central office and receives power therefrom when said hookswitch is closed, said paystation including means which responds to the receiving of power from said central office by generating a voltage, said information entering means and said control means being activated by said voltage.

21. The paystation of claim 20 wherein said handset and interface means includes a transmitter means and said control means further comprises means for providing to said handset and interface means a signal to turn off said transmitter means at all times other than when said control means has determined said user has dialed a complete telephone number to thereby allow said paystation to operate solely on said central office power.

22. The paystation of claim 18 including reset means which responds to the closing of said hookswitch by resetting said control means for a predetermined interval of time, said control means being activated by said reset means upon the termination of said predetermined time interval.

23. The paystation of claim 18 wherein said control means comprises:

(i) first means connected to receive said information entering means first and second output signals; and (ii) data output means connected to said first means to receive therefrom signals representative of said dialing information and said credit information, said data output means providing in response thereto said signals representative of said dialing information and said credit information to said interface means.

24. The paystation of claim 23 wherein said data output means responds to said representative signals by providing signals to said interface means in the form of multifrequency dual tones.

25. A credit only telephone paystation having handset and interface means including a transmitter means and a hookswitch for connecting said paystation to a central office by transmission means, said central office being the only and a limited source of power for operating said paystation and providing said limited power to said paystation over said transmission means only when said hookswitch is closed, said paystation comprising:
(a) power supply means which responds to the providing of power from said central office by generating a voltage;
(b) information entering means activated by said voltage for reading encoded credit information inserted therein by a user of said paystation and providing in response thereto a first output signal and for allowing said user to enter dialing information and providing in response thereto a second output signal, said credti information represnting the number of a credit account to which any telephone calls placed by said user shall be charged;
(c) readable nonvolatile storage means having stored therein a plurality of nonrestricted telephone numbers which may be dialed by said user without having to insert encoded credit information in said information entering means; and
(d) control means, said control means being inactive and being reset and activated by said voltage, said control means being connected to both said information entering means providing, in response to said information entering means first and second output signals, signals representative of said dialing information and said credit information to said interface means for connection to said central office, said control means also providing to said handset and interface means a signal to turn off said transmitter means at all times other than when said control means has determined that said user has dialed a complete telephone number to thereby allow said paystation to operate solely on said central office power, said control means receiving said plurality of nonrestricted numbers from said storage means and including means which responds to said information entering means second output signal to determined when said user has dialed one of said plurality of nonrestricted numbers and for transmitting said dialed nonrestrictive number to said handset and interface means.

26. The paystation of claim 25 including switch means connected to said control means, said switch means normally being open and capable of being closed to provide a signal to said control means, said control means further including means which responds to said signal to allow information entered through said information entering means to be written into said storage means whereby at least one of said plurality of nonrestricted telephone numbers may be changed.

27. The paystation of claim 25 wherein said control means comprises:
(i) first means connected to receive said information entering means first and second output signals; and
(ii) data output means connected to said first means to receive therefrom signals representative of said dialing information and said credit information, said data output means providing in response thereto said signals representative of said dialing information and said credit information to said interface means.

28. The paystation of claim 27 wherein said data output means responds to said representative signals by providing signals to said interface means in the form of multifrequency dual tones.

29. The paystation of claim 27 wherein said data output means includes means for generating said turnoff signal when said user is dialing and said first means includes means for generating said turnoff signal at all of said other times.

30. The paystation of claim 29 wherein said first means further includes means which responds to said information entering means second output signal by generating a signal when said user has dialed a complete telephone number to said turnoff signal generating means for turning off said turnoff signal.

31. The paystation of claim 27 wherein said first means includes a microcomputer, said microcomputer being inactive when said hookswitch is open and being reset and activated by said voltage.

32. The paystation of claim 31 wherein said first means further includes reset means which responds to the closing of said hookswitch by resetting said microcomputer for a predetermined interval of time, said microcomputer being activated by said reset means upon the termination of said predetermined time interval.

* * * * *